(12) United States Patent
Ogino et al.

(10) Patent No.: US 8,336,311 B2
(45) Date of Patent: Dec. 25, 2012

(54) LOW-PRESSURE-VAPOR-RECOVERY TURBINE GENERATOR

(75) Inventors: Shinji Ogino, Mihara (JP); Keiichi Meguro, Takasago (JP); Kohei Higaki, Mihara (JP); Akira Miki, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 865 days.

(21) Appl. No.: 12/516,240

(22) PCT Filed: Dec. 28, 2007

(86) PCT No.: PCT/JP2007/075293
§ 371 (c)(1),
(2), (4) Date: May 26, 2009

(87) PCT Pub. No.: WO2008/139666
PCT Pub. Date: Nov. 20, 2008

(65) Prior Publication Data
US 2010/0050638 A1 Mar. 4, 2010

(30) Foreign Application Priority Data
May 14, 2007 (JP) .................... 2007-128008

(51) Int. Cl.
*F01K 1/00* (2006.01)
(52) U.S. Cl. .......................... 60/670; 60/685
(58) Field of Classification Search ........... 60/643, 60/645, 670, 685
See application file for complete search history.

(56) References Cited

U.S. PATENT DOCUMENTS

| | | | | |
|---|---|---|---|---|
| 4,359,951 A | * | 11/1982 | Dauvergne | 110/234 |
| 4,510,757 A | * | 4/1985 | Graham, Jr. | 60/667 |
| 6,128,903 A | * | 10/2000 | Riege | 60/641.8 |
| 7,469,541 B1 | * | 12/2008 | Melton et al. | 60/641.1 |

FOREIGN PATENT DOCUMENTS

| | | |
|---|---|---|
| JP | 52-122701 | 10/1977 |
| JP | 62-59704 | 4/1987 |
| JP | 10-141013 | 5/1998 |
| JP | 11-107701 | 4/1999 |
| JP | 2001-349205 | 12/2001 |
| JP | 2002-4942 | 1/2002 |
| JP | 2005-42600 | 2/2005 |
| JP | 2005-139963 | 6/2005 |
| JP | 2006-329119 | 12/2006 |

OTHER PUBLICATIONS

International Search Report mailed Feb. 5, 2008 for International Application No. PCT/JP2007/075293.

* cited by examiner

*Primary Examiner* — Hoang Nguyen
(74) *Attorney, Agent, or Firm* — Wenderoth, Lind & Ponack, L.L.P.

(57) ABSTRACT

A low-pressure-vapor-recovery turbine generator that effectively recovers low-pressure steam emitted from a high-pressure-side steam turbine to generate electric power is provided. A low-pressure-vapor-recovery turbine that recovers low-pressure steam emitted from a high-pressure-side steam turbine and is rotationally driven, a generator that generates electric power with a rotational output of the low-pressure-vapor-recovery turbine, and a condenser that condenses into liquid exhaust steam from the low-pressure-vapor-recovery turbine are provided. The low-pressure-vapor-recovery turbine, generator, and condenser are installed in a portable outer casing that can be transported.

8 Claims, 12 Drawing Sheets

LOW-PRESSURE-VAPOR-RECOVERY TURBINE GENERATOR

TECHNICAL FIELD

The present invention relates to a low-pressure-vapor-recovery turbine generator that recovers low-pressure steam emitted from a high-pressure-side steam turbine to generate electric power.

BACKGROUND ART

In factories such as chemical plants, high- and medium-pressure steam is produced with a package boiler or a waste-heat boiler for various purposes. Because this high- and medium-pressure steam is accompanied by excess steam according to the fluctuation in the demand thereof, effective utilization is required, as shown in FIG. 12. In the figure, excess steam is introduced into a high- and medium-pressure steam header 101, a steam turbine 102 is rotated with steam supplied from this high- and medium-pressure steam header 101, and a driven machine 103, such as a pump or a compressor, is driven by this torque. Steam emitted from the steam turbine 102 is introduced to a low-pressure steam header 104 in the form of low-pressure steam at about 0.3 MPa (gauge pressure). After the pressure of the low-pressure steam in the low-pressure steam header 104 is reduced to a predetermined pressure by a pressure release valve 105, the low-pressure steam is condensed by a condenser 106. The condensate water produced by the condenser 106 is supplied to the boiler again by a condensate water pump 107.

In the related art, although energy is recovered by obtaining power for a driven machine with excess steam in this manner, the energy of used low-pressure steam is wasted by the pressure release valve 105. Particularly in small- and medium-scale plants, such as pulp and paper mills and food plants, quite a lot of low-pressure steam is produced to no avail due to fluctuation in the operating load.

Patent Document 1 discloses a technique for efficiently utilizing excess steam in a case where such excess steam is produced due to an abrupt reduction in plant steam.

Patent Document 1

Japanese Unexamined Patent Application, Publication No. HEI 10-141013

SUMMARY OF INVENTION

However, the process method described in that document does nothing more than release excess steam to the atmosphere or supply excess steam to a condenser; the process method fails to effectively recover low-pressure steam emitted from a turbine.

For this reason, there is a need for effectively recovering the energy of low-pressure steam emitted from a high-pressure-side steam turbine without wasting the low-pressure steam.

On the other hand, it is common that the number of stages in a steam turbine is two or more in order to effectively recover the energy of low-pressure steam when the turbine is to be driven with about 0.3 MPa (gauge pressure) low-pressure steam for power generation. However, if the number of stages in a turbine is two or more, the size of the steam turbine is increased and the steam turbine can be installed only in plants with a large installation space.

In addition, if auxiliary devices, such as condensers and condensate water pumps, are designed individually for a steam turbine that recovers low-pressure steam, neither a reduction in delivery time nor a cost reduction can be achieved.

Furthermore, when a steam turbine and auxiliary devices are installed individually at an installation site, many workers are needed and the installation procedures become complicated.

In the related art, therefore, it is difficult to generate electric power by recovering low-pressure steam emitted from a high-pressure-side steam turbine because of many problems, including the installation space, delivery time, and cost.

The present invention has been conceived in light of these circumstances, and an object thereof is to provide a low-pressure-vapor-recovery turbine generator that can be installed in practice and that can effectively recover low-pressure steam emitted from a high-pressure-side steam turbine to generate electric power.

In order to solve the above-described problems, a low-pressure-vapor-recovery turbine generator according to the present invention provides the following solutions.

Specifically, a low-pressure-vapor-recovery turbine generator according to one aspect of the present invention includes a low-pressure-vapor-recovery turbine that recovers low-pressure steam emitted from a high-pressure-side steam turbine and is rotationally driven; a generator that generates electric power with a rotational output of the low-pressure-vapor-recovery turbine; and a condenser that condenses exhaust steam from the low-pressure-vapor-recovery turbine into liquid, wherein the low-pressure-vapor-recovery turbine, the generator, and the condenser are installed in a portable outer casing that can be transported.

The energy of low-pressure steam that was discarded without being utilized in the related art can now be effectively used by recovering low-pressure steam emitted from the high-pressure-side steam turbine with the low-pressure-vapor-recovery turbine and generating electric power with the generator.

Furthermore, because the condenser that condenses exhaust steam from the low-pressure-vapor-recovery turbine into liquid is provided, saturated water produced by the condenser can be returned to a water supply system in an installation plant.

In addition, because the low-pressure-vapor-recovery turbine, the generator, and the condenser are installed in the portable outer casing that can be transported with a transporting apparatus such as a trailer or a crane, the process of introduction into a site is almost completed merely by installing the portable outer casing in the installation plant, thus shortening the work. More specifically, after the low-pressure-vapor-recovery turbine, the generator, and the condenser are installed in the portable outer casing at an assembly plant, the portable outer casing is transported to the installation plant by trailer and is installed with a crane at the on-site installation plant.

Furthermore, the engineering time and the delivery time can be reduced by preparing the low-pressure-vapor-recovery turbine generators with different outputs (e.g., three levels of output) as standard facilities because integration (skidding) is possible by installing the low-pressure-vapor-recovery turbine, generator, and condenser in the portable outer casing.

The low-pressure-vapor-recovery turbine according to one aspect of the present invention recovers steam that is emitted from the high-pressure-side steam turbine and is supposed to be discarded without being used to drive the steam turbine and hence is differentiated from the low-pressure turbine of a multi-stage steam turbine provided with a high-pressure turbine and a low-pressure turbine on the same rotating shaft.

Furthermore, in the low-pressure-vapor-recovery turbine generator according to one aspect of the present invention, the number of turbine stages of the low-pressure-vapor-recovery turbine is one.

If the number of turbine stages of the low-pressure-vapor-recovery turbine is one, the shaft length of the low-pressure-vapor-recovery turbine can be reduced compared with a case where the number of stages is two or more. Because of this, accommodation in the portable outer casing is possible without difficulty.

Furthermore, in the low-pressure-vapor-recovery turbine generator according to one aspect of the present invention, all-circumferential injection is achieved such that the low-pressure steam flows substantially all along a circumferential direction in which turbine rotor blades of the low-pressure-vapor-recovery turbine rotate.

Due to all-circumferential injection of low-pressure steam, energy can be recovered with high efficiency. Because of this, even a single-stage turbine can ensure the required power generation level.

Furthermore, because all-circumferential injection reduces the load on the turbine rotor blades compared with a case where low-pressure steam is injected partially, not only can the shapes of the turbine rotor blades be optimized according to the flow, but also the efficiency can be enhanced.

Furthermore, in the low-pressure-vapor-recovery turbine generator according to one aspect of the present invention, a reduction gear that reduces a rotational speed of an output shaft of the low-pressure-vapor-recovery turbine is provided between the low-pressure-vapor-recovery turbine and the generator, and an integrated-gear type is achieved such that the output shaft of the low-pressure-vapor-recovery turbine is connected directly to the reduction gear, not via a coupling.

Because the low-pressure-vapor-recovery turbine is connected to the reduction gear of the integrated-gear type, the need for a coupling can be eliminated and the size can be reduced.

Furthermore, in the low-pressure-vapor-recovery turbine generator according to one aspect of the present invention, the low-pressure-vapor-recovery turbine is accommodated in the portable outer casing, a discharge opening formed by opening a downstream end of an exhaust steam pipe that introduces exhaust steam from the low-pressure-vapor-recovery turbine and an introduction opening formed by opening an upstream end of an exhaust-steam introduction pipe that introduces exhaust steam into the condenser are provided in a wall portion of the portable outer casing, and a connecting pipe that connects between the discharge opening and the introduction opening can be connected between the openings and outside the portable outer casing.

The discharge opening of the exhaust steam pipe connected to the low-pressure-vapor-recovery turbine and the introduction opening of the exhaust-steam introduction pipe connected to the condenser are provided in a wall portion of the portable outer casing. Then, after the low-pressure-vapor-recovery turbine generator is installed at a particular position of the installation plant, the openings are connected to each other with the connecting pipe outside the portable outer casing. By doing so, a flow channel for exhaust steam from the low-pressure-vapor-recovery turbine extends up to the condenser. Because connection is made possible outside the portable outer casing and the connecting pipe is not provided in the portable outer casing as described above, a space in the portable outer casing can be secured, thereby relieving restrictions upon the installation space for various devices.

Furthermore, the low-pressure-vapor-recovery turbine generator according to one aspect of the present invention may include a synchronizing apparatus that synchronizes electric power output from the generator with an external system.

Because the low-pressure-vapor-recovery turbine generator with the above-described structure includes the synchronizing apparatus, it can easily be operated in parallel with the external system.

In addition, the post-installation work can be made easier by preinstalling the synchronizing apparatus in the low-pressure-vapor-recovery turbine generator.

The synchronizing apparatus is preferably provided in a local panel installed on one side of the outer casing.

Furthermore, in the low-pressure-vapor-recovery turbine generator according to one aspect of the present invention, the outer casing is a container.

Because the outer casing of a standardized size is constructed by making the outer casing of the container, it can easily be transported by a transporting apparatus such as a trailer for installation. A dry container used as a shipping container is appropriate for the container. More specifically, a dry container specified as 40 ft in an ISO standard is preferable.

Furthermore, in the low-pressure-vapor-recovery turbine generator according to one aspect of the present invention, the outer casing has a two-stage structure in which the containers are stacked one over another, the low-pressure-vapor-recovery turbine is installed in the upper container, and the condenser is installed in the lower container.

With the two-stage structure where the containers are stacked one over another, the low-pressure-vapor-recovery turbine is installed in the upper container and the condenser is installed in the lower container. Therefore, exhaust steam discharged from the low-pressure-vapor-recovery turbine is introduced into the condenser located below. As a result, because exhaust steam in the form of wet steam is introduced, by virtue of its weight, into the condenser below, the condensed water can be smoothly introduced downward.

Furthermore, in the low-pressure-vapor-recovery turbine generator according to one aspect of the present invention, the low-pressure-vapor-recovery turbine is accommodated in the container, the condenser is provided on a ceiling of the container, the condenser is of an air-cooled type including a cooling fan that takes in outside air to cool exhaust steam from the low-pressure-vapor-recovery turbine, and an exhaust opening via which outside air taken in by the cooling fan and passing through the container is discharged outside is provided in a wall portion of the container.

Because the low-pressure-vapor-recovery turbine is accommodated in the container and the air-cooled condenser having the cooling fan is provided over the ceiling of the container, the low-pressure-vapor-recovery turbine generator can be composed of one container.

In addition, as a result of outside air taken in by the cooling fan being discharged outside through the container from the exhaust opening, the atmosphere in the container heated by low-pressure steam introduced into the low-pressure-vapor-recovery turbine can be cooled.

According to the low-pressure-vapor-recovery turbine generator of the present invention, because the low-pressure-vapor-recovery turbine, the generator, and the condenser are installed in the portable outer casing, not only is installation easy but also low-pressure steam emitted from the high-pressure-side steam turbine can be effectively recovered to generate electric power.

Figure 1:
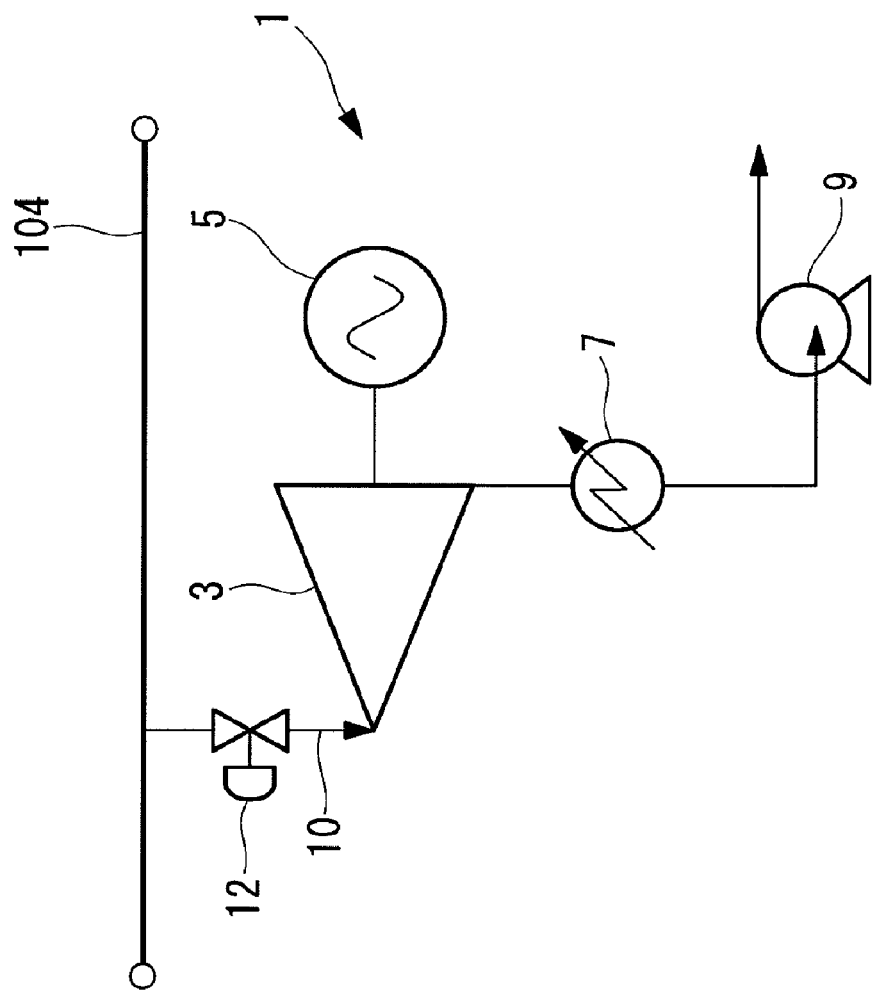
FIG. 1 is a schematic diagram of the connection structure of a low-pressure-vapor-recovery turbine generator according to a first embodiment of the present invention.

EXPLANATION OF REFERENCE SIGNS 1, 1': low-pressure-vapor-recovery turbine generator
3: steam turbine (low-pressure-vapor-recovery turbine)
5: generator
7, 7': condenser
9: condensate water pump
14, 14': outer casing (portable outer casing)
14a, 14b, 14c: container
16: reduction gear
55: synchronizing apparatus
61: cooling fan

DETAILED DESCRIPTION OF THE INVENTION

Embodiments according to the present invention will be described with reference to the drawings.

First Embodiment

FIG. 1 is a schematic diagram of the connection structure of a low-pressure-vapor-recovery turbine generator 1 according to a first embodiment of the present invention.

Figure 12:
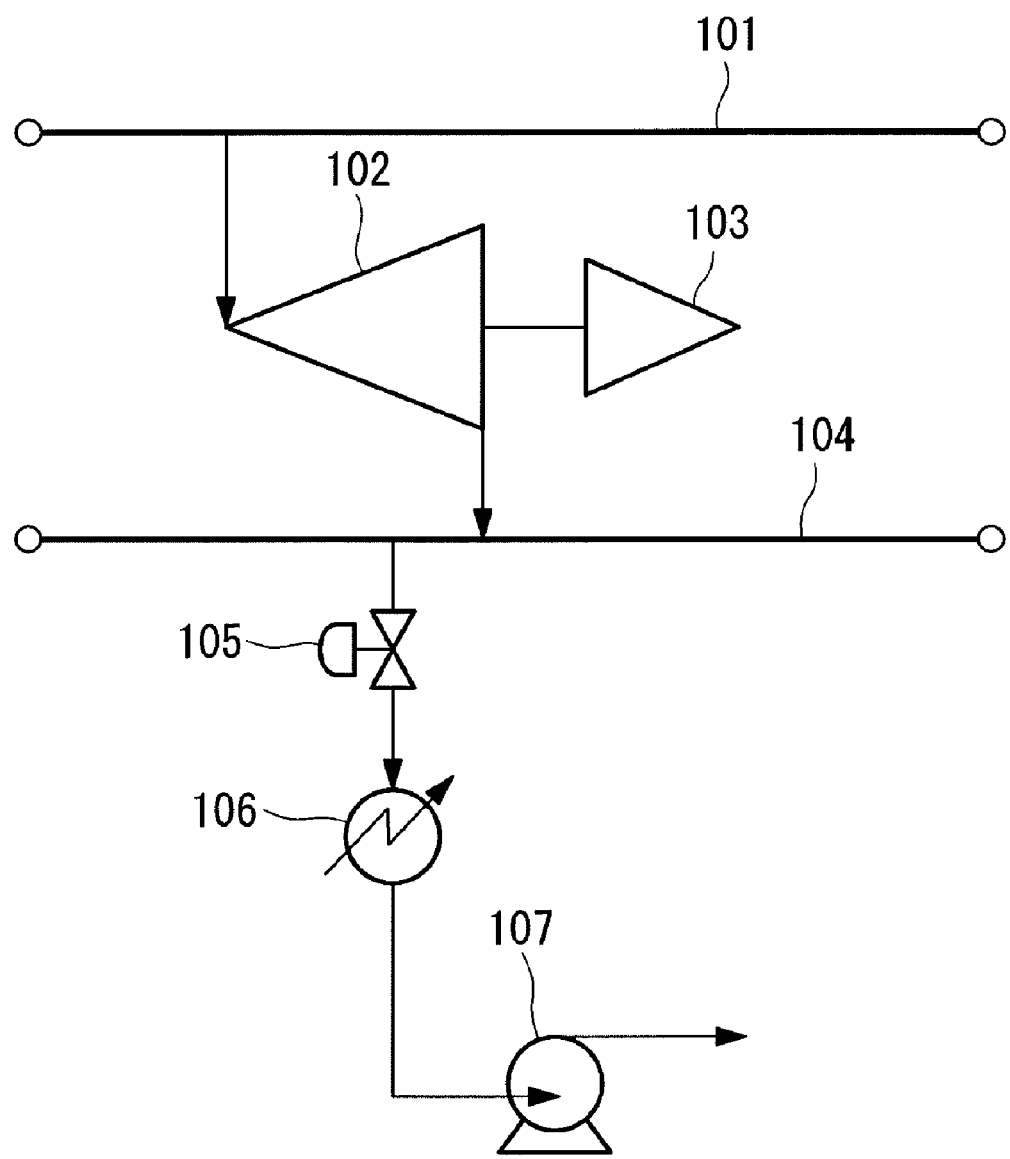
FIG. 12 is a schematic diagram illustrating effective utilization of excess steam in the related art.

The low-pressure-vapor-recovery turbine generator 1 receives about 0.3 MPa (gauge pressure) low-pressure steam through a low-pressure steam header 104 to generate electric power. As described with reference to FIG. 12, which shows the related art, exhaust steam from a high-pressure-side steam turbine is supplied to the low-pressure steam header 104.

The low-pressure-vapor-recovery turbine generator 1 includes a low-pressure-vapor-recovery turbine (hereinafter, referred to just as the "steam turbine") 3 that is rotationally driven with recovered low-pressure steam; a generator 5 that generates electric power with the rotational output of the steam turbine 3; a condenser 7 that condenses into liquid the exhaust steam from the steam turbine 3; and a condensate water pump 9 that transports the condensate water produced by the condenser 7 to an external water supply system.

A low-pressure-steam introduction pipe 10 that connects between the low-pressure steam header 104 and the steam turbine 3 is provided with a control valve 12 for adjusting the steam flow rate.

Figure 2:
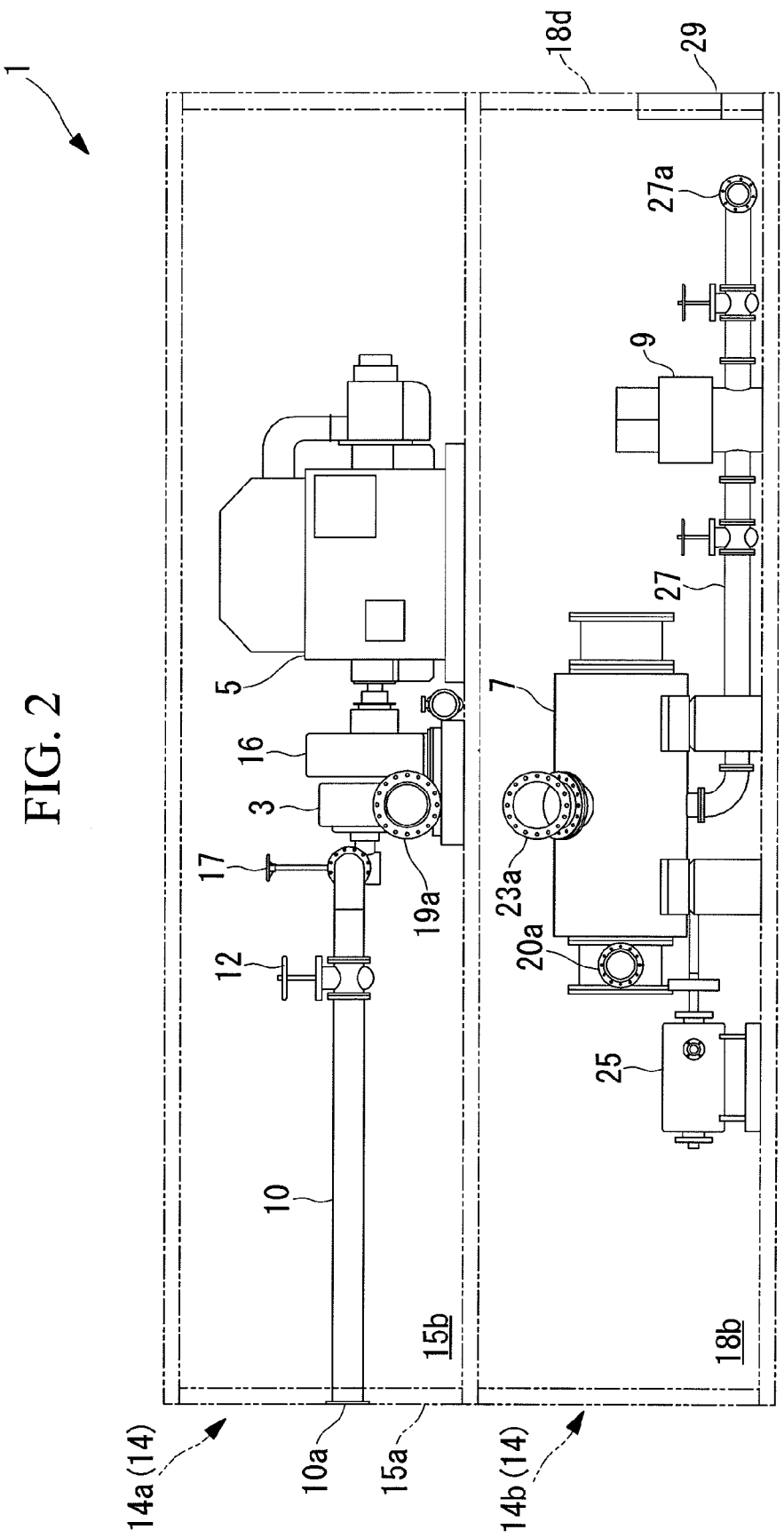
FIG. 2 is a side elevational view of the low-pressure-vapor-recovery turbine generator according to the first embodiment of the present invention, being disposed in an outer casing.
Figure 3:
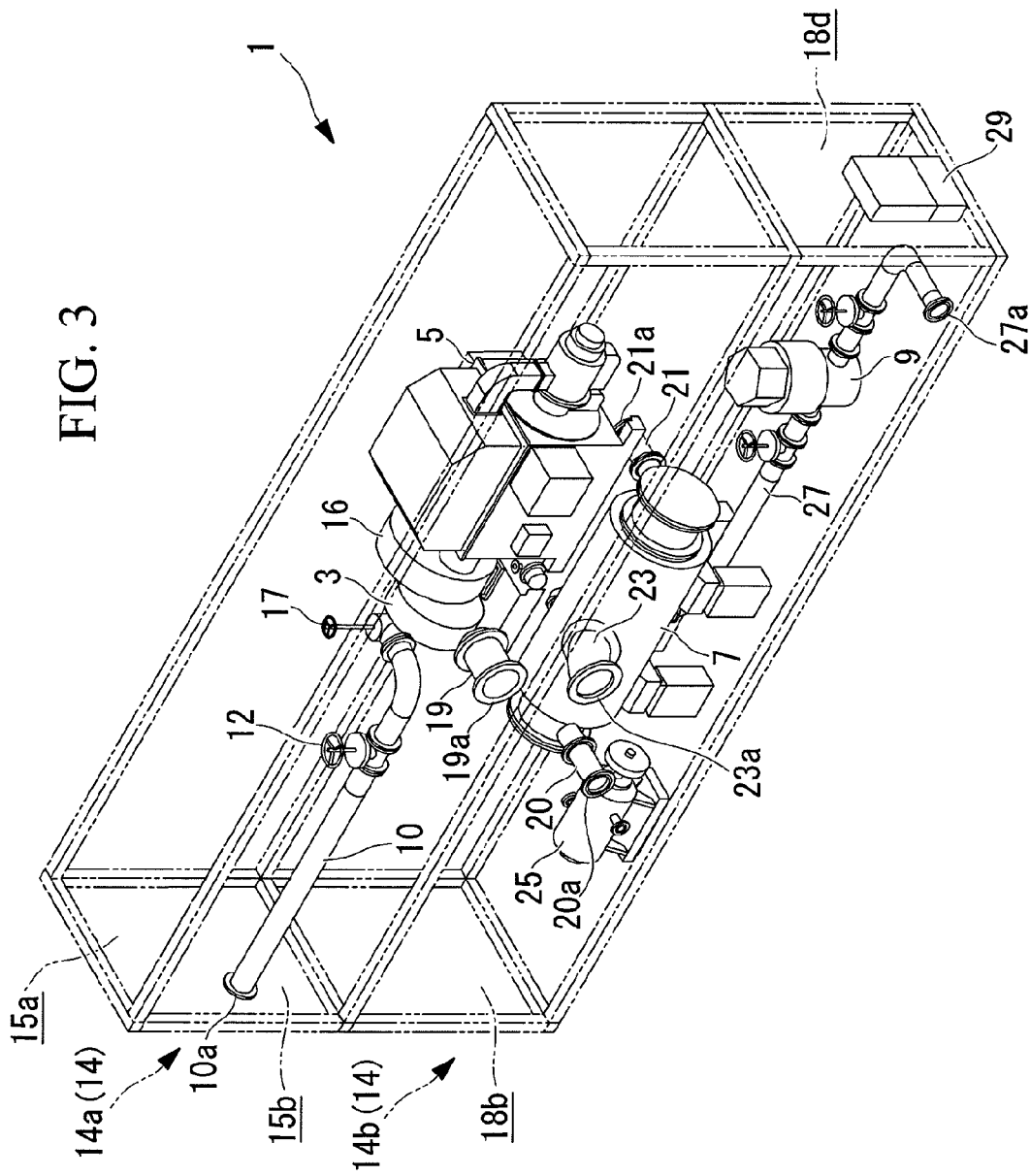
FIG. 3 is a rear-oblique perspective view of the low-pressure-vapor-recovery turbine generator in FIG. 2 where a generator is closer to the viewer than a steam turbine is.
Figure 4:
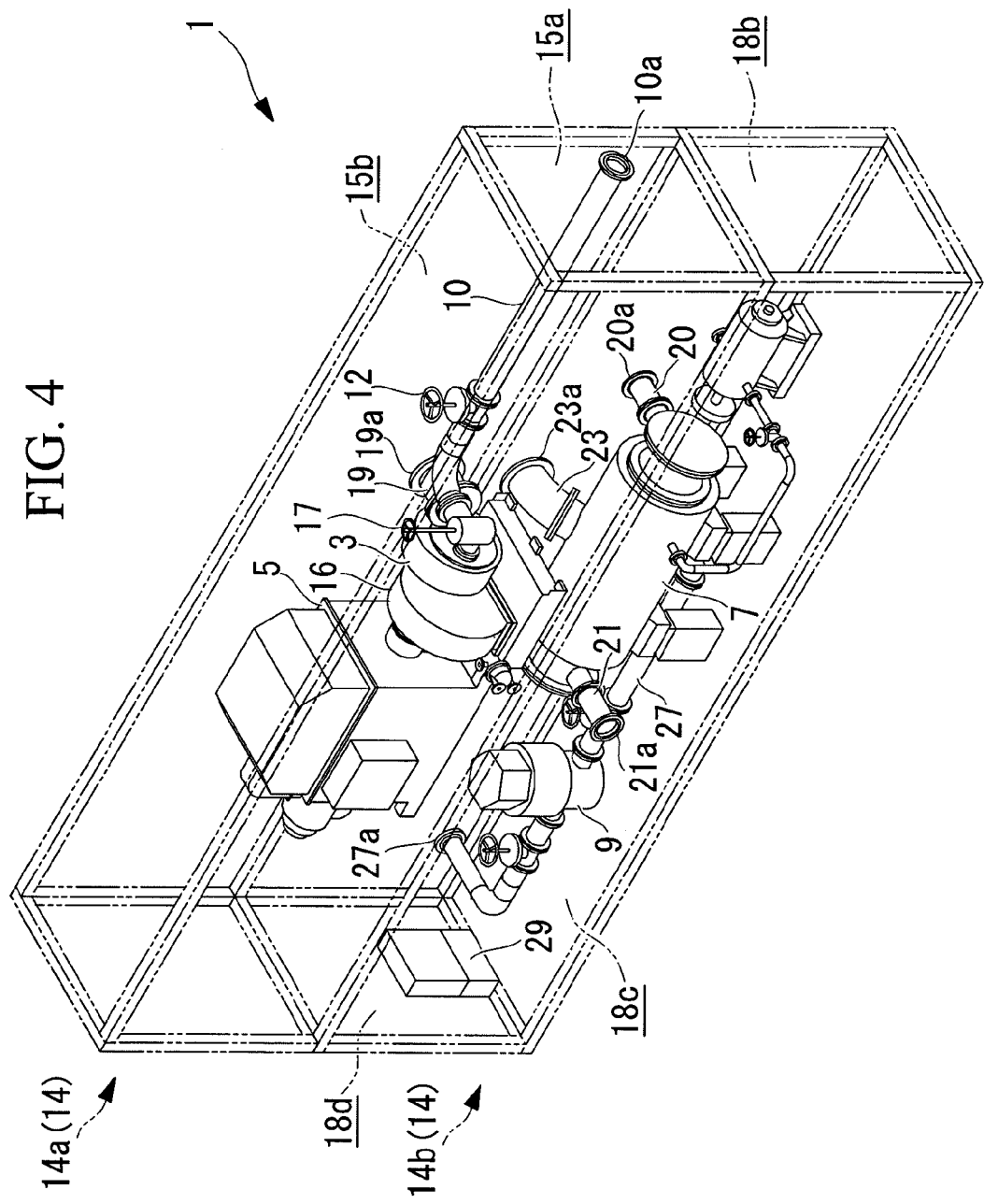
FIG. 4 is a rear-oblique perspective view of the low-pressure-vapor-recovery turbine generator in FIG. 2 where a steam turbine is closer to the viewer than a generator is.

FIGS. 2 to 4 show the low-pressure-vapor-recovery turbine generator 1 containing the above-described steam turbine 3, generator 5, condenser 7, condensate water pump 9, control valve 12, and so forth in an outer casing 14. FIG. 2 is a side elevational view of the low-pressure-vapor-recovery turbine generator 1. FIG. 3 is a rear-oblique perspective view with the generator 5 located closer to the viewer than the steam turbine 3 is. FIG. 4 is a rear-oblique perspective view with the steam turbine 3 located closer to the viewer than the generator 5 is.

As shown in the figures, the low-pressure-vapor-recovery turbine generator 1 according to this embodiment is integrated (skidded) with various devices, such as the steam turbine 3, installed in the outer casing 14. It is preferable that this unit be prepared as a standard facility having about three levels of output (e.g., 200 kW, 500 kW, and 1000 kW), classified according to the flow rate of supplied low-pressure steam.

The outer casing 14 includes an upper container 14a and a lower container 14b. More specifically, a two-story structure is achieved such that the upper container 14a is stacked over the lower container 14b, and the containers are secured by fixing means such as welding. A dry container, specified as 40 ft in an ISO standard, is used for each of the containers 14a and 14b. In this manner, because the outer casing 14 is composed of standardized containers, it is portable and can easily be transported with a transporting apparatus such as a trailer or a crane.

The steam turbine 3 and the generator 5 are installed in the upper container 14a. The steam turbine 3 and the generator 5 are installed such that their respective rotating shafts (not shown in the figure) are oriented in the longitudinal direction of the container 14a.

A connecting flange 10a of the low-pressure-steam introduction pipe 10 that introduces low-pressure steam into the steam turbine 3 is provided on a front wall portion 15a orthogonal to the longitudinal direction of the upper container 14a. A governor 17 serving as a speed-governing apparatus is provided downstream of the control valve 12 provided in the low-pressure-steam introduction pipe 10.

A reduction gear 16 that reduces the rotational speed of an output shaft of the steam turbine 3 is provided between the steam turbine 3 and the generator 5. As described below, an integrated-gear type in which the output shaft of the steam turbine 3 is connected directly (not via a coupling) to the reduction gear 16 is realized.

An exhaust steam pipe 19 (refer to FIG. 3) for introducing the steam that has passed through the steam turbine 3 is connected to the steam turbine 3. The exhaust steam pipe 19 includes a steam discharge flange (discharge opening) 19a at a downstream end thereof. The steam discharge flange 19a is provided on a lateral wall portion 15b extending along the longitudinal direction of the upper container 14a.

The condenser 7 and the condensate water pump 9 are installed in the lower container 14b.

The condenser 7 is of a water-cooled type and, as shown in FIGS. 3 and 4, includes a cooling-water introduction pipe 20 that introduces cooling water from outside and a cooling-water discharge pipe 21. The cooling-water introduction pipe 20 includes an introduction flange 20a at an upstream end thereof. This introduction flange 20a is provided on a lateral wall portion 18b (closer to the viewer in FIG. 3) extending along the longitudinal direction of the lower container 14b. The cooling-water discharge pipe 21 includes a discharge flange 21a at the downstream end thereof. This discharge flange 21a is provided on another lateral wall portion 18c (closer to the viewer in FIG. 4) of the lower container 14b.

The condenser 7 includes an exhaust-steam introduction pipe 23 (refer to FIGS. 3 and 4) that introduces exhaust steam introduced from the steam turbine 3. The exhaust-steam introduction pipe 23 includes a steam introduction flange (introduction opening) 23a at an upstream end thereof. The steam introduction flange 23a is provided on the lateral wall portion 18b (closer to the viewer in FIG. 3) of the lower container 14b. This steam introduction flange 23a and the above-described steam discharge flange 19a are provided on the lateral wall portions 18b and 15b of the containers 14b and 14a constituting the same surface of the outer casing 14 and, furthermore, are made to open in the outward direction of the containers 14b and 14a. Therefore, the flanges 23a and 19a can be connected to each other via a connecting pipe (not shown in the figure) outside the outer casing 14. A flow channel for exhaust steam from the steam turbine 3 extends up to the condenser 7 by connecting the connecting pipe between the flanges 23a and 19a, as described above.

A vacuum pump 25 is further installed in the lower container 14b. The condenser 7 is evacuated by this vacuum pump 25. As a result, a condensing turbine exploiting a large enthalpy drop (e.g., discharge pressure of 500 mmHgV) is realized. For example, a water-sealed centrifugal vacuum pump is used for the vacuum pump 25.

A condensate water discharge pipe 27 is connected to the bottom of the condenser 7. The condensate water discharge pipe 27 is provided with the condensate water pump 9, which transports condensate water pooled in the condenser 7 to the external water supply system (not shown in the figure). The upstream end of the condensate water discharge pipe 27 is connected to the bottom of the condenser 7 so that the height position of the condensate water discharge pipe 27 is lower than the condenser 7. By doing so, the condensate water pump 9 can take advantage of the static head of saturated water (condensate water) pooled in the condenser 7.

The condensate water discharge pipe 27 includes a condensate water discharge flange 27a at a downstream end thereof. This condensate water discharge flange 27a is provided at a lower part of the lateral wall portion 18b of the lower container 14b.

A local panel 29 is provided on a rear wall portion 18d of the lower container 14b. The local panel 29 contains various devices for controlling and operating the steam turbine 3, the generator 5, the condensate water pump 9, and the vacuum pump 25.

Although not shown in the figure, a door via which operators can enter and exit is provided at a predetermined location of the lower container 14b. A stairway connecting between a floor portion of the lower container 14b and a floor portion of the upper container 14a is also provided.

Figure 5:
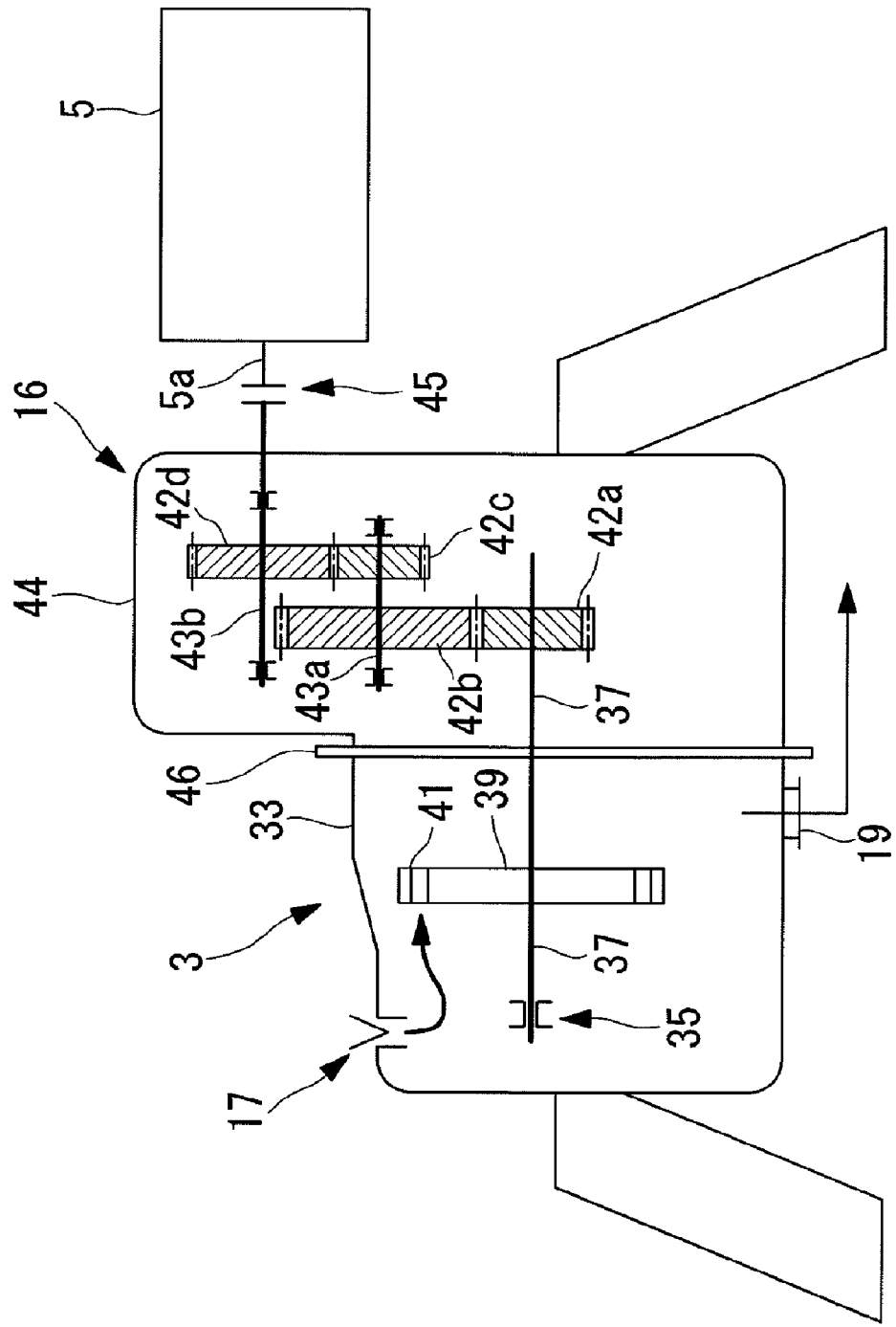
FIG. 5 is a schematic longitudinal sectional view of a steam turbine (low-pressure-vapor-recovery turbine) and a reduction gear of an integrated-gear type.

FIG. 5 is a schematic cross-sectional side view of the steam turbine 3 of the integrated-gear type. As shown in the figure, a rotating shaft 37 rotatably supported by a bearing 35 is disposed in a steam-turbine casing 33. A rotor 39 that rotates together with the rotating shaft 37 is secured to the rotating shaft 37. A plurality of turbine rotor blades 41 are secured to the circumferential surface of the rotor 39 at predetermined intervals in the circumferential direction. Low-pressure steam whose flow rate has been adjusted by the governor 17 flows to these turbine rotor blades 41. The steam that has flowed to the turbine rotor blades 41 and finished working flows out via the exhaust steam pipe 19 provided on the steam-turbine casing 33.

The rotating shaft 37 of the steam turbine 3 is an output shaft that outputs a torque and is connected to a gear accommodated in a reduction-gear casing 44. More specifically, one end of the rotating shaft 37 serving as an output shaft extends into the reduction-gear casing 44, and a first gear 42a is secured to the far end thereof. The first gear 42a is meshed with a second gear 42b having a larger number of gear teeth than this first gear 42a. The second gear 42b is secured to an intermediate-gear shaft 43a. A third gear 42c having a smaller number of gear teeth than the second gear 42b is secured to this intermediate-gear shaft 43a. The third gear 42c is meshed with a fourth gear 42d having a larger number of gear teeth than this third gear 42c. The fourth gear 42d is secured to a final-stage-gear shaft 43b. This final-stage-gear shaft 43b extends to the outside of the reduction-gear casing 44 and is connected to an input shaft 5a of the generator 5 via a coupling 45 that transmits a torque.

The steam-turbine casing 33 is coupled with the reduction-gear casing 44 via a connecting section 46 such as a flange.

In this manner, an integrated-gear type is achieved such that the rotating shaft (output shaft) 37 of the steam turbine 3 is connected directly (not via a coupling) to the first gear 42a of the reduction gear 16. Because the need for a coupling is eliminated as described above, the sizes of the steam turbine 3 and the reduction gear 16 in the axial direction can be reduced to achieve a downsizing structure.

Figure 6:
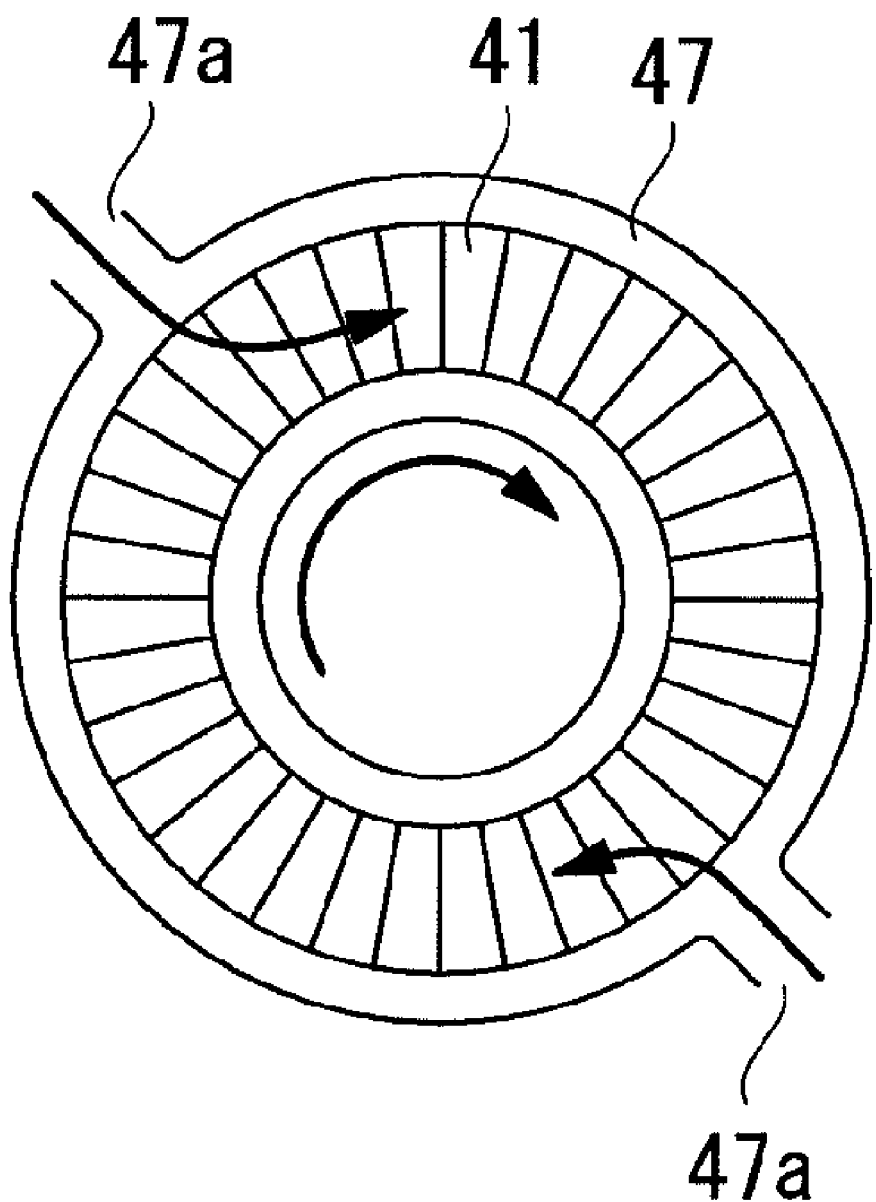
FIG. 6 is a schematic front elevational view where low-pressure steam is injected all around the turbine rotor blades of a steam turbine (low-pressure-vapor-recovery turbine).

FIG. 6 is a front view of the turbine rotor blades 41 of the steam turbine 3. As shown in the figure, an introduction flow channel 47 that extends 360° around the circumferential direction in which the turbine rotor blades 41 rotate is formed at an upstream end of the turbine rotor blades 41. Due to this introduction flow channel 47, low-pressure steam flows via an inlet opening 47a all around the circumference of the turbine rotor blades 41. In other words, the introduction flow channel 47 is formed such that low-pressure steam flows substantially uniformly to all of the plurality of turbine rotor blades 41 provided in the circumferential direction of the rotor 39 (refer to FIG. 5).

Because all-circumferential injection is achieved such that low-pressure steam flows substantially all along the circumferential direction in which the turbine rotor blades 41 rotate as described above, energy can be recovered with high efficiency. As a result, even a single-stage turbine can ensure a required power generation level.

In addition, all-circumferential injection produces a reduced load upon the turbine rotor blades compared with a case where low-pressure steam is injected partially, and therefore not only can the shapes of the turbine rotor blades be optimized according to the stream of flowing steam, but also the efficiency can be enhanced.

Figure 7:
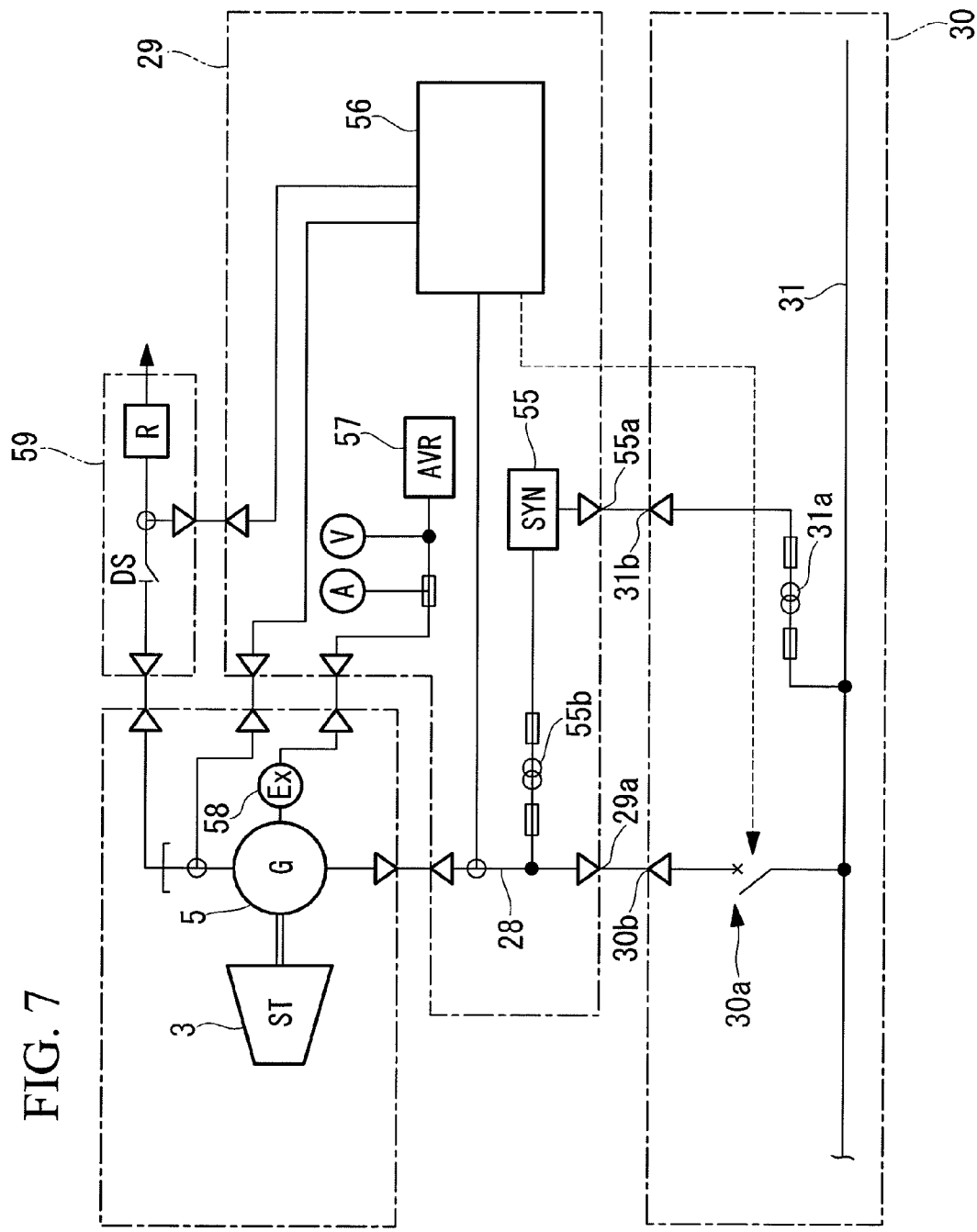
FIG. 7 is a schematic diagram depicting the electrical system of a low-pressure-vapor-recovery turbine generator 1.

FIG. 7 is a schematic diagram depicting the electrical system of the above-described low-pressure-vapor-recovery turbine generator 1.

The electric power output from the generator 5 is sent via power output wiring 28 in the local panel 29 to an existing high-voltage switchboard 30 provided outside the low-pressure-vapor-recovery turbine generator 1. The electric power that has been sent to the high-voltage switchboard 30 is sent to a bus (external system) 31 via a circuit breaker 30*a* that cuts off the power when tripped. The voltage of the bus is, for example, 6.6 kV or 3.3 kV.

The local panel 29 includes a synchronizing apparatus 55, a protective relay instrument 56 with an interlock function, and an automatic voltage regulator (AVR: Automatic Voltage Regulator) 57.

A transformer 55*b* is provided between the synchronizing apparatus 55 and the power output wiring 28 so that a decreased voltage signal is supplied to the synchronizing apparatus 55. The phase signal of the bus 31 is input to the synchronizing apparatus 55 from an external input terminal 55*a*. The high-voltage switchboard 30 is provided with an output terminal 31*b* connected to the bus 31 via a transformer 31*a* so that the phase signal of the bus 31 can be output to the external input terminal 55*a*.

Because the synchronizing apparatus 55 is provided to adjust the phases of the electric power output from the generator 5 and the bus 31 as described above, the generator 5 can easily be operated in parallel with the bus 31. Furthermore, because the low-pressure-vapor-recovery turbine generator 1 is provided with the local panel 29 including the synchronizing apparatus 55, the burden of post-installation work can be relieved.

With reference to the output from the generator 5, the protective relay instrument 56 issues an interlock signal in the event of an abnormality (when tripped) to switch off the circuit breaker 30*a* in the high-voltage switchboard 30.

The automatic voltage regulator 57 adjusts the output voltage from the generator to a constant value based on an electrical current and a voltage obtained from an exciter 58 connected to the generator 5.

Furthermore, an NGR board 59 provided with a neutral grounding resistor (Neutral Grounding Resistor) is connected to the generator 5. This NGR board 59 can be optionally omitted.

The installation procedure for the low-pressure-vapor turbine generator 1 with the above-described structure will now be described.

First, the 40 ft containers 14*a* and 14*b*, in compliance with an ISO standard, are stacked one over another at an assembly plant, and these containers 14*a* and 14*b* are secured by, for example, welding to form the outer casing 14. Next, the steam turbine 3, the reduction gear 16, the generator 5, and so forth are installed in the upper container 14*a*. The condenser 7, the condensate water pump 9, the vacuum pump 25, the local panel 29, and so forth are installed in the lower container 14*b*. Then, the local panel 29 is connected with wires to the steam turbine 3, the generator 5, the condensate water pump 9, and the vacuum pump 25. By installing various devices as described above, the unit (hereinafter, referred to as the "assembly unit") shown in FIG. 2 is constructed.

Thereafter, the assembly unit is transported from the assembly plant to an installation plant by trailer. At this time, because the outer casing 14 is composed of the ISO standards-compliant containers 14*a* and 14*b*, it can easily be loaded on the trailer. Furthermore, when it is to be loaded on the trailer, a crane provided with a general-purpose spreader can be used.

The assembly unit that has been transported to the installation plant by trailer is unloaded from the trailer using a predetermined crane and then moved to a predetermined installation site in the installation plant.

At the installation site, a feed pipe (not shown in the figure) introduced from the low-pressure steam header 104 is connected to the connecting flange 10*a* of the low-pressure-steam introduction pipe 10. In addition, outside the outer casing 14, a connecting pipe (not shown in the figure) is connected between the steam introduction flange 23*a* and the steam discharge flange 19*a*. Furthermore, the condensate water discharge flange 27*a* of the condensate water discharge pipe 27 is connected to a water supply pipe (not shown in the figure) that is to be connected to a boiler feedwater system of the installation plant. In addition, a cooling-water pipe installed in the installation plant is connected to the introduction flange 20*a* of the cooling-water introduction pipe 20, and the discharge flange 21*a* of the cooling-water discharge pipe 21 is connected to a drain pipe provided in the installation plant.

Subsequently, a power output terminal 29*a* of the local panel 29 is connected to a power input terminal 30*b* of the external high-voltage switchboard 30, and the external input terminal 55*a* of the synchronizing apparatus 55 is connected to the output terminal 31*b* that outputs the phase signal of the bus 31 (refer to FIG. 7).

Next, the operation of the low-pressure-vapor turbine generator 1 with the above-described structure will be described.

About 0.3 MPa low-pressure steam that has finished acting on the high-pressure-side steam turbine (refer to, for example, the steam turbine 102 in FIG. 12) is discharged to the low-pressure steam header 104 (refer to FIG. 1), and the low-pressure steam is supplied from this low-pressure steam header 104 to the low-pressure-vapor-recovery turbine generator 1 shown in FIG. 2. The low-pressure steam is introduced from the connecting flange 10*a* of the low-pressure-steam introduction pipe 10, the steam flow rate is adjusted by the control valve 12, and the low-pressure steam is introduced to the governor 17. In the governor 17, the steam flow rate is adjusted so that the rotational speed of the steam turbine 3 is set to the required rotational speed.

The low-pressure steam that has passed through the governor 17 flows into the steam-turbine casing 33 of the steam turbine 3 shown in FIG. 5 and acts on the turbine rotor blades 41 of the steam turbine 3. At this time, as shown in FIG. 6, the low-pressure steam is subjected to all-circumferential injection to the turbine rotor blades 41 to efficiently recover energy. The work produced by the low-pressure steam is transmitted to the rotor 39 and the rotating shaft 37 via the turbine rotor blades 41 and taken out as a rotational output in the form of mechanical power. The rotational output from the rotating shaft 37 is transmitted to the reduction gear 16 connected directly (not via a coupling) to the rotating shaft 37 and decreased to the required rotational speed. The rotational output from the reduction gear 16 is transmitted from the final-stage-gear shaft 43*b* via the coupling 45 to the input shaft 5*a* of the generator 5. The generator 5 converts the mechanical torque input from the input shaft 5*a* into electrical energy to generate electric power.

The steam that has finished acting on the turbine rotor blades 41 is discharged from the exhaust steam pipe 19. As shown in, for example, FIG. 3, the exhaust steam introduced into the exhaust steam pipe 19 flows through the connecting pipe (not shown in the figure) connected between the steam discharge flange 19*a* at a downstream end thereof and the steam introduction flange 23*a* and is introduced into the steam introduction pipe 23 disposed therebelow.

The exhaust steam that has flowed into the steam introduction pipe 23 is introduced into the condenser 7. The space in the condenser 7 into which the exhaust steam is introduced is evacuated by the vacuum pump 25, and thereby the exhaust steam is introduced into the condenser 7.

The exhaust steam that has been introduced into the condenser 7 is cooled with cooling water introduced from the cooling-water introduction pipe 20, condensed into saturated water, and pooled at the bottom of the condenser 7. The cooling water that has been supplied from the cooling-water introduction pipe 20 and has deprived the exhaust steam of the latent heat of condensate water is externally discharged via the cooling-water discharge pipe 21.

The saturated water (condensate water) that has been pooled at the bottom of the condenser 7 is discharged by the condensate water pump 9 to the external water supply system via the condensate water discharge pipe 27. Because the condensate water discharge pipe 27 is provided on the bottom of the condenser 7 and the condensate water pump 9 is disposed at a lower position than the condenser 7, saturated water can be transported smoothly by the condensate water pump 9 by exploiting the static head of the saturated water pooled in the condenser 7.

The electric power generated by the generator 5 is regulated to a required voltage by the automatic voltage regulator 57, as shown in FIG. 7. After the phases of the generated power output and the bus 31 have been adjusted by the synchronizing apparatus 55 provided in the local panel 29, the generated power output is supplied to the bus 31 provided on the external high-voltage switchboard 30.

With the low-pressure-vapor turbine generator 1 of the embodiment described above, the following advantages are afforded.

By recovering, with the steam turbine 3, the low-pressure steam that is emitted from the high-pressure-side steam turbine (not shown in the figure) to generate electric power with the generator, it is possible to effectively use the energy of low-pressure steam that was discarded without being utilized in the related art.

Furthermore, because the condenser 7 that condenses into liquid the exhaust steam from the steam turbine 3 is provided, saturated water produced by the condenser can be returned to the water supply system in the installation plant.

In addition, the installation work can be simplified because the steam turbine 3, the generator 5, and the condenser 7 are installed in the outer casing 14 that can be transported using a transporting apparatus such as a trailer or a crane and thus the process of installation at a site is substantially completed merely by installing the portable outer casing 14 in the installation plant.

Furthermore, the engineering time and the delivery time can be reduced by preparing the low-pressure-vapor-recovery turbine generator 1 with different outputs as a standard facility because integration (skidding) is possible by installing the steam turbine 3, the generator 5, and the condenser 7 in the outer casing 14.

Because the number of turbine stages in the steam turbine 3 is one (refer to FIG. 5), the shaft length of the low-pressure-vapor-recovery turbine can be shortened compared with a case where the number of stages is two or more. By doing so, accommodation into the outer casing 14 is made possible without difficulty.

Furthermore, because the steam turbine 3 that achieves all-circumferential injection of low-pressure steam is employed (refer to FIG. 6), the energy can be recovered with high efficiency. By doing so, even the single-stage steam turbine 3 can ensure the required power generation level. In addition, because all-circumferential injection reduces the load upon the turbine rotor blades compared with a case where low-pressure steam is partially injected, not only can the shape of the turbine rotor blades 41 be optimized according to the flow, but also the efficiency can be enhanced.

Because the steam turbine 3 is connected to the reduction gear 16 of the integrated-gear type (refer to FIG. 5), the need for a coupling can be eliminated, thereby achieving a compact size.

Because the steam discharge flange 19a of the exhaust steam pipe 19 connected to the steam turbine 3 and the steam introduction flange 23a of the exhaust-steam introduction pipe 23 connected to the condenser 7 are provided on the lateral wall portions 15b and 18b of the outer casing 14, what is needed is simply to install the low-pressure-vapor-recovery turbine generator 1 and then to connect a connecting pipe (not shown in the figure) outside the outer casing 14. This relieves the burden of installation work. Furthermore, because it is not necessary to install a connecting pipe in the outer casing 14, sufficient space can be secured in the outer casing 14, thereby relieving restrictions upon the installation space for various devices.

Because the synchronizing apparatus 55 is provided in the local panel 29 of the low-pressure-vapor-recovery turbine generator 1, the generator 5 can easily be operated in parallel with an external system. In addition, the burden of post-installation work can be relieved by preinstalling the synchronizing apparatus 55 in the local panel 29.

Because the outer casing 14 is constructed using the ISO standards-compliant containers 14a and 14b, it can easily be transported and installed by trailer or crane.

The exhaust steam discharged from the steam turbine 3 is introduced to the condenser 7 located therebelow because a two-stage structure is achieved such that the containers 14a and 14b are stacked one over another, the steam turbine 3 is installed in the upper container 14a, and the condenser 7 is installed in the lower container 14b. By doing so, because exhaust steam in the form of wet steam is introduced to the condenser 7 located below due to its weight, condensed water can be smoothly introduced downward.

Second Embodiment

A second embodiment according to the present invention will now be described with reference to FIGS. 8 to 11.

This embodiment differs from the first embodiment mainly in that the condenser is of an air-cooled type and that the outer casing includes only one container. In this embodiment, the same components as those in the first embodiment are denoted with the same reference numerals, and hence a description thereof will be omitted as necessary.

Figure 8:
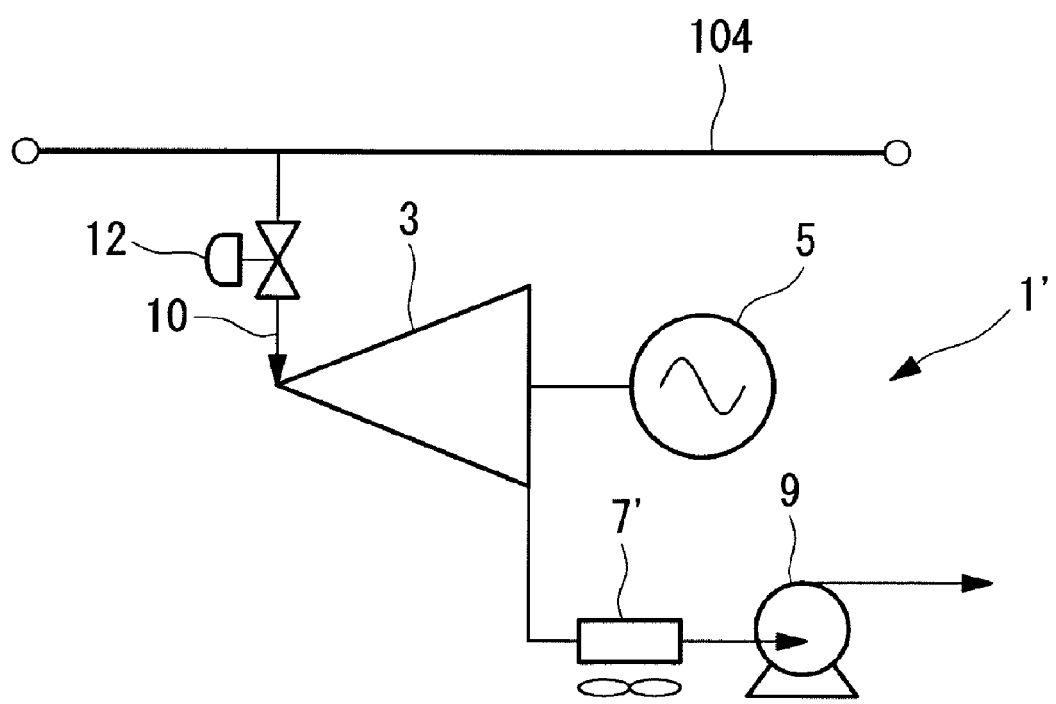
FIG. 8 is a schematic diagram depicting the connection structure of a low-pressure-vapor-recovery turbine generator according to a second embodiment of the present invention.

As shown in FIG. 8, a low-pressure-vapor-recovery turbine generator 1' receives about 0.3 MPa (gauge pressure) low-pressure steam through a low-pressure steam header 104 to generate electric power. As described with reference to FIG. 12, which shows the related art, exhaust steam from a high-pressure-side steam turbine is supplied to the low-pressure steam header 104.

The low-pressure-vapor-recovery turbine generator 1' includes a low-pressure-vapor-recovery turbine (hereinafter, referred to simply as the "steam turbine") 3 that recovers low-pressure steam and is rotationally driven; a generator 5 that generates electric power with the rotational output of the steam turbine 3; an air-cooled condenser 7' that condenses into liquid the exhaust steam from the steam turbine 3; and a condensate water pump 9 that transports the condensate water produced by the condenser 7' to an external water supply system.

A low-pressure-steam introduction pipe 10 that connects between the low-pressure steam header 104 and the steam turbine 3 is provided with a control valve 12 for adjusting the steam flow rate.

Figure 9:
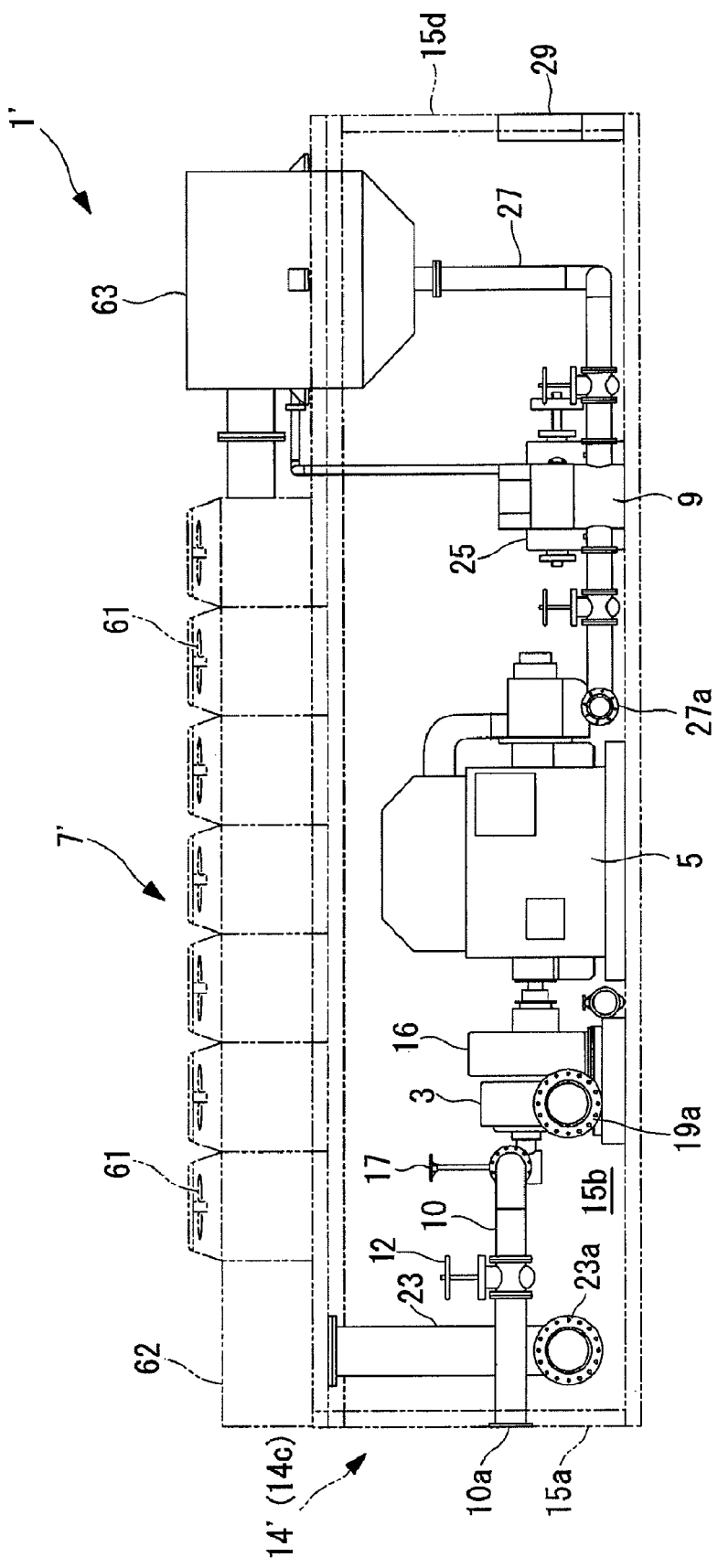
FIG. 9 is a side elevational view of the low-pressure-vapor-recovery turbine generator according to the second embodiment of the present invention, being disposed in an outer casing.
Figure 10:
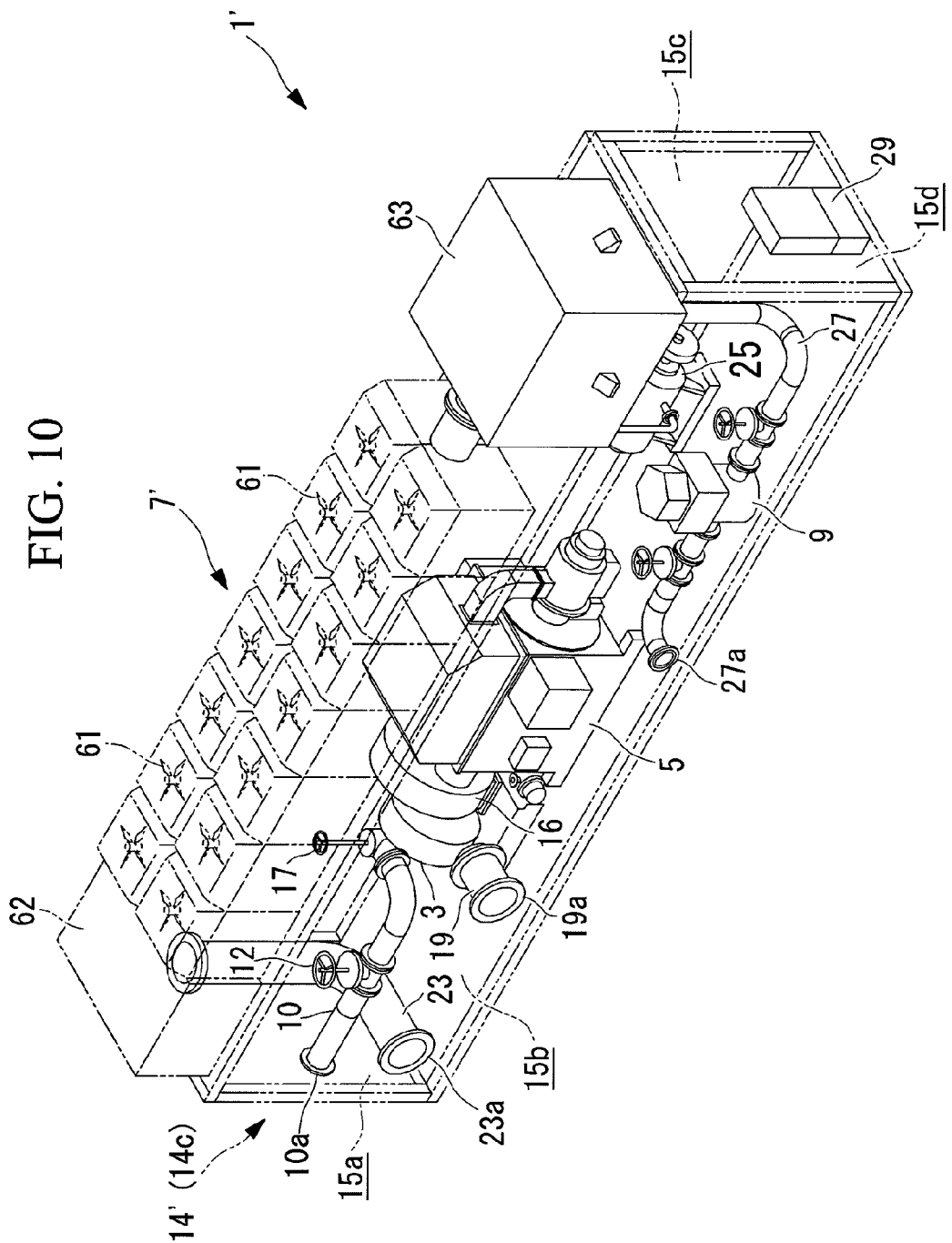
FIG. 10 is a rear-oblique perspective view of the low-pressure-vapor-recovery turbine generator in FIG. 9 where a generator is closer to the viewer than a steam turbine is.
Figure 11:
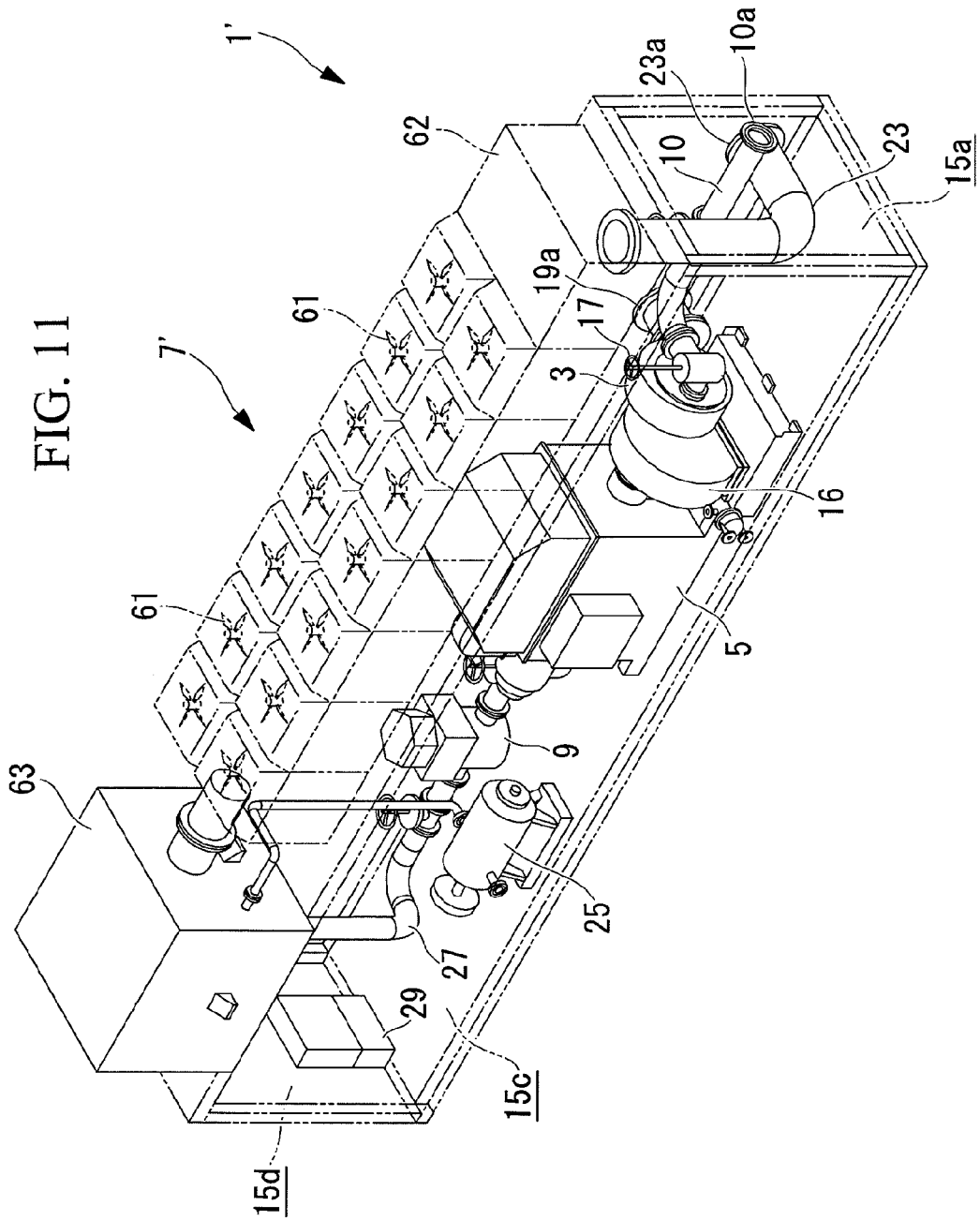
FIG. 11 is a rear-oblique perspective view of the low-pressure-vapor-recovery turbine generator in FIG. 9 where a steam turbine is closer to the viewer than a generator is.

FIGS. 9 to 11 show the low-pressure-vapor-recovery turbine generator 1' containing the above-described steam turbine 3, generator 5, condenser 7', condensate water pump 9, control valve 12, and so forth in an outer casing 14'. FIG. 9 is a side elevational view of the low-pressure-vapor-recovery turbine generator 1'. FIG. 10 is a rear-oblique perspective view with the generator 5 located closer to the viewer than the steam turbine 3 is. FIG. 11 is a rear-oblique perspective view with the steam turbine 3 located closer to the viewer than the generator 5 is.

As shown in the figures, the low-pressure-vapor-recovery turbine generator 1' according to this embodiment is integrated (skidded) with various devices, such as the steam turbine 3, installed in the outer casing 14'. It is preferable that this unit be prepared as a standard facility having about three levels of output (e.g., 200 kW, 500 kW, and 1000 kW), classified according to the flow rate of supplied low-pressure steam.

The outer casing 14' includes one container 14c. A dry container, specified as 40 ft in an ISO standard, is used for the container 14c. In this manner, because the outer casing 14' is composed of a standardized container, it is portable and can easily be transported with a transporting apparatus such as a trailer or a crane.

The steam turbine 3 and the generator 5 are installed on the bottom of the outer casing 14'. The steam turbine 3 and the generator 5 are installed such that their respective rotating shafts (not shown in the figure) are oriented in the longitudinal direction of the outer casing 14'.

A connecting flange 10a of the low-pressure-steam introduction pipe 10 that introduces low-pressure steam into the steam turbine 3 is provided on a front wall portion 15a orthogonal to the longitudinal direction of the outer casing 14'. A governor 17 serving as a speed-governing apparatus is provided downstream of the control valve 12 provided in the low-pressure-steam introduction pipe 10.

A reduction gear 16 that reduces the rotational speed of output shaft of the steam turbine 3 is provided between the steam turbine 3 and the generator 5. Like the first embodiment, the steam turbine 3 and the reduction gear 16 are formed as an integrated-gear type (refer to FIG. 5).

An exhaust steam pipe 19 for introducing the steam that has passed through the steam turbine 3 is connected to the steam turbine 3 (refer to FIGS. 10 and 11). The exhaust steam pipe 19 includes a steam discharge flange (discharge opening) 19a at a downstream end thereof. The steam discharge flange 19a is provided on a lateral wall portion 15b (closer to the viewer in FIG. 10) extending along the longitudinal direction of the outer casing 14'.

Although not shown in the figure, it is preferable that the exhaust steam pipe 19 be provided with a steam trap for discharging drain water condensed in the pipe.

The air-cooled condenser 7' is installed over the ceiling of the outer casing 14'. More specifically, the condenser 7' includes an exhaust-steam introduction header 62 to which a downstream end of an exhaust-steam introduction pipe 23 is connected; a condensate water tank 63; many heat transfer tubes (not shown in the figure) that extend between the exhaust-steam introduction header 62 and the condensate water tank 63 and have exhaust steam flowing therein; and a plurality of cooling fans 61 that air-cool the outer surfaces of the heat transfer tubes.

The cooling fans 61 aspirate outside air from above the outer casing 14' and cool the heat transfer tubes located therebelow. The cooled outside air flows through the outer casing 14' and is externally discharged from an exhaust opening (not shown in the figure) provided in a wall portion (e.g., lateral wall portions at both sides) of the outer casing 14'.

The condensed water that has flowed through the heat transfer tubes and has been cooled by the cooling fans 61 is introduced into the condensate water tank 63 and pooled in a hot well provided under the condensate water tank 63.

The condenser 7' includes the exhaust-steam introduction pipe 23 that introduces exhaust steam introduced from the steam turbine 3. The exhaust-steam introduction pipe 23 includes a steam introduction flange (introduction opening) 23a at an upstream end thereof (refer to, for example, FIG. 10). The steam introduction flange 23a is provided on the lateral wall portion 15b of the outer casing 14'. This steam introduction flange 23a and the above-described steam discharge flange 19a are provided on the lateral wall portion 15b of the outer casing 14' and, furthermore, are made to open in the outward direction of the outer casing 14'. Therefore, the flanges 23a and 19a can be connected to each other via a connecting pipe (not shown in the figure) outside the outer casing 14'. A flow channel for exhaust steam from the steam turbine 3 extends up to the condenser 7' by connecting the connecting pipe between the flanges 23a and 19a as described above.

A vacuum pump 25 is installed on the bottom of the outer casing 14'. The condenser 7, namely, the condensate water tank 63 is evacuated by this vacuum pump 25. As a result, a condensate water turbine exploiting a great enthalpy drop (e.g., discharge pressure of 500 mmHgV) is realized. For example, a water-sealed centrifugal vacuum pump is used for the vacuum pump 25.

A condensate water discharge pipe 27 is connected to the bottom of the condensate water tank 63. The condensate water discharge pipe 27 is provided with the condensate water pump 9 installed on the bottom of the outer casing 14', and this condensate water pump 9 transports condensate water pooled in the condensate water tank 63 to the external water supply system (not shown in the figure).

Because the condensate water tank 63 is disposed over the ceiling of the outer casing 14' and the condensate water pump 9 is provided on the bottom of the outer casing 14', a high static head of the saturated water pooled in the condensate water tank 63 can be achieved.

As shown in, for example, FIG. 10, the condensate water discharge pipe 27 includes a condensate water discharge flange 27a at a downstream end thereof. This condensate water discharge flange 27a is provided on the lateral wall portion 15b of the outer casing 14'.

A local panel 29 is provided on a rear wall portion 15c of the outer casing 14'. The local panel 29 contains various devices for controlling and operating the steam turbine 3, the generator 5, the condensate water pump 9, and the vacuum pump 25.

Although not shown in the figure, a door via which operators can enter and exit is provided at a predetermined location of the outer casing 14'.

The points that the steam turbine 3 is single-staged and all-circumferential injection is realized are the same as in the first embodiment (refer to FIGS. 5 and 6), and hence a description thereof will be omitted. The electrical system of the low-pressure-vapor-recovery turbine generator 1' is also the same as that in the first embodiment (refer to FIG. 7), and a description thereof will be omitted.

The installation procedure for the low-pressure-vapor turbine generator 1' with the above-described structure will now be described.

First, the ISO standards-compliant 40 ft container 14c constituting the outer casing 14' is prepared at an assembly plant. Next, the steam turbine 3, the reduction gear 16, the generator 5, the condensate water pump 9, the vacuum pump 25, the local panel 29, and so forth are installed in the container 14c. Furthermore, the condenser 7' is installed over the ceiling of the container 14c. Then, the local panel 29 is connected with wires to the steam turbine 3, the generator 5, the condensate water pump 9, and the vacuum pump 25. By installing various devices as described above, the unit (hereinafter, referred to as the "assembly unit") shown in FIGS. 9 to 11 is constructed.

Thereafter, the assembly unit is transported from the assembly plant to an installation plant by trailer. At this time, because the outer casing 14' is composed of the ISO standards-compliant container 14c, it can easily be loaded on the trailer. Furthermore, when it is to be loaded on the trailer, a crane provided with a general-purpose spreader can be used.

The assembly unit that has been transported to the installation plant by trailer is unloaded from the trailer using a predetermined crane and then moved to a predetermined installation site in the installation plant.

At the installation site, a feed pipe (not shown in the figure) introduced from the low-pressure steam header 104 is connected to the connecting flange 10a of the low-pressure-steam introduction pipe 10. In addition, outside the outer casing 14', a connecting pipe (not shown in the figure) is connected between the steam introduction flange 23a and the steam discharge flange 19a. Furthermore, the condensate water discharge flange 27a of the condensate water discharge pipe 27 is connected to a water supply pipe (not shown in the figure) that is to be connected to a boiler feed water system of the installation plant.

Subsequently, a power output terminal 29a of the local panel 29 is connected to a power input terminal 30b of an external high-voltage switchboard 30, and an external input terminal 55a of a synchronizing apparatus 55 is connected to an output terminal 31b that outputs the phase signal of a bus 31 (refer to FIG. 7).

Next, the operation of the low-pressure-vapor turbine generator 1' with the above-described structure will be described.

About 0.3 MPa low-pressure steam that has finished acting in the high-pressure-side steam turbine (refer to, for example, the steam turbine 102 in FIG. 12) is discharged to the low-pressure steam header 104 (refer to FIG. 8), and the low-pressure steam is supplied from this low-pressure steam header 104 to the low-pressure-vapor-recovery turbine generator 1' shown in FIGS. 9 to 11. The low-pressure steam is introduced from the connecting flange 10a of the low-pressure-steam introduction pipe 10, the steam flow rate is adjusted by the control valve 12, and the low-pressure steam is introduced to the governor 17. In the governor 17, the steam flow rate is adjusted so that the rotational speed of the steam turbine 3 is set to the required rotational speed.

The low-pressure steam that has passed through the governor 17 flows into the steam turbine 3, as described in the first embodiment, to produce a mechanical torque. The produced mechanical torque is converted into electrical energy by the generator 5 to generate electric power.

The steam (wet steam) that has finished acting in the steam turbine 3 is discharged from the exhaust steam pipe 19. As shown in FIG. 10, the exhaust steam introduced into the exhaust steam pipe 19 flows through the connecting pipe (not shown in the figure) connected between the steam discharge flange 19a at a downstream end thereof and the steam introduction flange 23a and is introduced into the steam introduction pipe 23 disposed thereabove. The drain water that has been condensed in the exhaust steam pipe 19 is discharged by the steam trap (not shown in the figure). For this reason, the condensed water is not introduced into the condenser 7' on the downstream side.

Although in this embodiment the steam introduction pipe 23 is disposed at a higher position than the exhaust steam pipe 19, the exhaust steam flows into the exhaust-steam introduction header 62 of the condenser 7' because the condenser 7' is evacuated by the vacuum pump 25.

While flowing through the heat transfer tubes (not shown in the figure), the steam that has been introduced into the exhaust-steam introduction header 62 of the condenser 7' is cooled by outside air supplied from the cooling fans 61 and is condensed. The condensed, saturated water is pooled in the hot well of the condensate water tank 63.

The outside air that has cooled the heat transfer tubes flows through the outer casing 14' and is externally discharged from the exhaust opening (not shown in the figure) provided on a wall portion of the outer casing 14'.

The saturated water pooled in the hot well of the condensate water tank 63 is discharged by the condensate water pump 9 installed on the bottom of the outer casing 14' into the external water supply system via the condensate water discharge pipe 27. Because the condensate water pump 9 is provided on the bottom of the outer casing 14' for the condensate water tank 63 installed over the ceiling of the outer casing 14', the static head of the saturated water pooled in the condensate water tank 63 can be made higher, thereby smoothly transporting the saturated water using the condensate water pump 9.

As described in the first embodiment with reference to FIG. 7, the electric power generated by the generator 5 is supplied to the bus 31 provided in the external high-voltage switchboard 30 after the phases of the generated power and the bus 31 have been adjusted by the synchronizing apparatus 55 provided in the local panel 29.

With the low-pressure-vapor turbine generator 1' of the embodiment described above, the following advantages are afforded. A description of advantages similar to those afforded with the same structure as that in the first embodiment will be omitted.

Because the low-pressure-vapor-recovery turbine 3 is accommodated in the container 14c constituting the outer casing 14' and the condenser 7' is provided over the ceiling of the container 14c, the low-pressure-vapor-recovery turbine generator 1' can be constructed with one container.

Furthermore, because the outside air that has been taken in by the cooling fans 61 is externally discharged from the exhaust opening through the outer casing 14', the atmosphere in the container, which has been heated by the steam taken in by the steam turbine 3, can be cooled.

Although in the above-described embodiments, the outer casings 14 and 14' are constructed using the ISO standards-compliant containers 14a, 14b, and 14c, the present invention is not limited to this. A container in compliance with another standard is also acceptable. Furthermore, any outer casing composed of a frame and wall portions may also be employed.

In addition, although the outer casings 14 and 14' preferably have a box structure shaped like a rectangular parallelepiped, as described in the foregoing embodiments, the shapes of the outer casings according to the present invention are not limited to this.

Furthermore, although in the above-described embodiments the vacuum pump 25 is used to evacuate the condensers 7 and 7', an ejector may be used in place of this. In this case, some of the low-pressure steam supplied to the low-pressure-vapor-recovery turbine generators 1 and 1' can be used for ejector-driving steam. In particular, because the steam turbine 3 having a single turbine stage is employed and therefore a high degree of vacuum is not required in the above-described embodiments, low-pressure steam supplied to the low-pressure-vapor-recovery turbine generators 1 and 1' can be used appropriately.

The invention claimed is:

1. A low-pressure-vapor-recovery turbine generator comprising:
   a low-pressure-vapor-recovery turbine that recovers low-pressure steam emitted from a high-pressure-side steam turbine and is rotationally driven;
   a generator that generates electric power with a rotational output of the low-pressure-vapor-recovery turbine; and
   a condenser that condenses exhaust steam from the low-pressure-vapor-recovery turbine into liquid,
   wherein the low-pressure-vapor-recovery turbine, the generator, and the condenser are installed in a portable outer casing that can be transported,
   wherein the low-pressure-vapor-recovery turbine is accommodated in the portable outer casing,
   wherein a discharge opening formed by opening a downstream end of an exhaust steam pipe that introduces exhaust steam from the low-pressure-vapor-recovery turbine and an introduction opening formed by opening an upstream end of an exhaust-steam introduction pipe that introduces exhaust steam into the condenser are provided in a wall portion of the portable outer casing,
   and wherein a connecting pipe that connects between the discharge opening and the introduction opening can be connected between the openings and outside the portable outer casing.

2. The low-pressure-vapor-recovery turbine generator according to claim 1,
   wherein the number of turbine stages of the low-pressure-vapor-recovery turbine is one.

3. The low-pressure-vapor-recovery turbine generator according to claim 1,
   wherein all-circumferential injection is achieved such that the low-pressure steam flows substantially all along a circumferential direction in which turbine rotor blades of the low-pressure-vapor-recovery turbine rotate.

4. The low-pressure-vapor-recovery turbine generator according to claim 1,
   wherein a reduction gear that reduces a rotational speed of an output shaft of the low-pressure-vapor-recovery turbine is provided between the low-pressure-vapor-recovery turbine and the generator, and
   an integrated-gear type is achieved such that the output shaft of the low-pressure-vapor-recovery turbine is connected directly to the reduction gear, not via a coupling.

5. The low-pressure-vapor-recovery turbine generator according to claim 1, further comprising:
   a synchronizing apparatus that synchronizes electric power output from the generator with an external system.

6. The low-pressure-vapor-recovery turbine generator according to claim 1,
   wherein the outer casing is a container.

7. The low-pressure-vapor-recovery turbine generator according to claim 6,
   wherein the outer casing has a two-stage structure in which the containers are stacked one over another,
   the low-pressure-vapor-recovery turbine is installed in the upper container, and
   the condenser is installed in the lower container.

8. The low-pressure-vapor-recovery turbine generator according to claim 6,
   wherein
   the condenser is provided on a ceiling of the container,
   the condenser is of an air-cooled type including a cooling fan that takes in outside air to cool exhaust steam from the low-pressure-vapor-recovery turbine, and
   an exhaust opening via which outside air taken in by the cooling fan and passing through the container is discharged outside is provided in a wall portion of the container.

* * * * *